April 29, 1958   D. R. HOUSTON   2,832,888
BOX CAR DETECTOR
Filed May 17, 1956
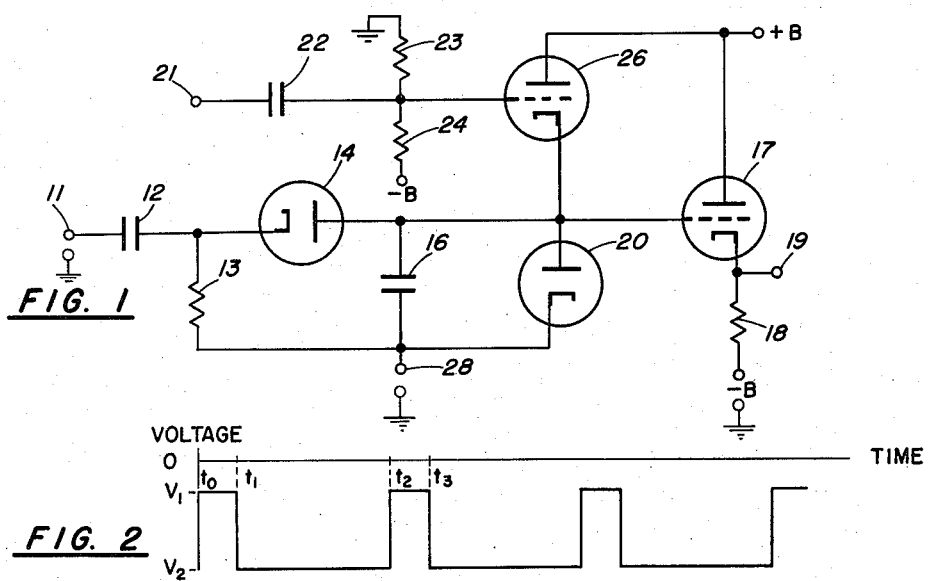
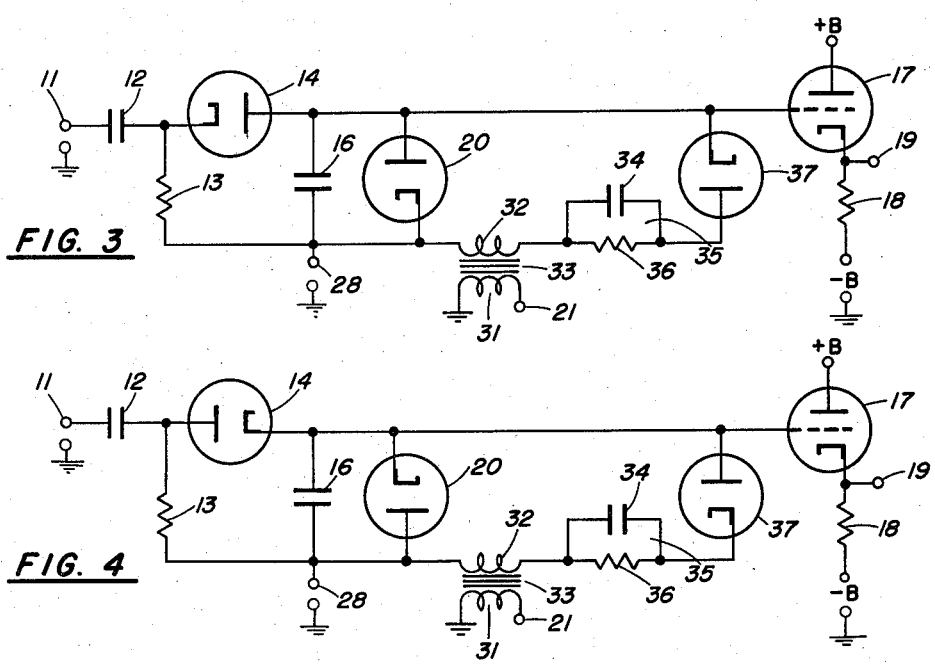
INVENTOR
DAVID R. HOUSTON
BY
ATTORNEYS

2,832,888

BOX CAR DETECTOR

David R. Houston, North Linthicum, Md., assignor, by mesne assignments, to the United States of America as represented by the Secretary of the Navy Application May 17, 1956, Serial No. 585,581

5 Claims. (Cl. 250—27)

The present invention relates to an improved box car detector.

In radar systems the useful information for such functions as angle tracking and automatic gain control, etc., appears in the form of narrow pulses on the order of perhaps one-half of a microsecond. In order to actually utilize this information its form must be converted from pulsed to continuous voltage. A circuit termed a box car detector is frequently used for this conversion. In the conventional box car detector, the pulse information is received in the form of pulses that are trapped on a capacitor and the resultant direct current (D. C.) voltage is tapped off usually by means of a cathode follower circuit. A non-integrated D. C. voltage is generally desired and thus the charge on the trapping capacitor must be discharged once each radar cycle after the information pulses have been received. Also, the D. C. output voltage must be restored to the same value after each discharge of the trapping capacitor; otherwise the magnitude of the D. C. output voltage has little significance. A diode which is joined in parallel across the trapping capacitor with its polarity such that the charge on the capacitor does not fire the diode, is utilized to clamp or restore the output D. C. voltage to a desired value after each cycle of operation. In conventional box car detectors, the cathode of a multi-element tube, such as a triode, is connected to the plate of the shunt diode, if the circuit is utilized to receive negative pulses. When it is desired to discharge the trapping capacitor, a positive discharge pulse is applied to the grid of the multi-element tube, thereby forcing this tube to conduct whereby its cathode is raised to a potential that is sufficiently positive to fire the shunt clamping diode. The low resistance of the conducting shunt diode and of the multi-element tube provide, respectively, a clamping and discharge path for the trapping capacitor. This conventional box car detector has a disadvantage in that the positive discharge pulse has to be of a very high magnitude since it must overcome the negative charge on the cathode of the multi-element tube. Also, the relatively low plate supply voltage is the limiting workable amplitude on the information pulses. Another disadvantage is that severe circuit changes are required to alter this box car detector to render it operable to positive rather than negative information pulses, and vice versa.

In the present improved box car detector, the multi-element tube is eliminated and the clamping diode is shunted with a series connected circuit comprising the secondary of a step-up transformer, a self-biasing circuit such as a parallel resistor-capacitor combination, and a diode having its cathode connected in polarity opposition to the clamping diode. A pulse applied to the primary of the step-up transformer triggers the series diode thereby providing a discharge path for the trapping capacitor and also a triggering path for the clamping diode. The step-up transformer permits the use of a smaller discharge pulse, the self-biasing circuit eliminates the grid voltage supply required by a multi-element tube, and the inverse voltage of the series diode sets the limiting workable amplitude on the information pulses rather than the substantially lower maximum plate voltage of the multi-element tube in the conventional box car detector.

Accordingly, an object of the present invention is the provision of a box car detector that functions with a low magnitude discharge pulse.

Another object is to provide an improved box car detector that requires only a low magnitude discharge pulse and which has need of only a minimum number of voltage supply sources.

A further object of the invention is the provision of an improved box car detector that requires only a small amplitude discharge pulse and a minimum number of voltage sources and which places a high limiting workable amplitude on the input information pulses.

Other objects and many of the attendant advantages of this invention will be readily appreciated as the same becomes better understood by reference to the following detailed description when considered in connection with the accompanying drawings wherein:

Fig. 1 shows a circuit diagram of a conventional box car detector,

Fig. 2 is a graph of the operation of box car detectors having negative pulse inputs, Fig. 3 shows a circuit diagram of a preferred embodiment of the invention, and Fig. 4 is a circuit diagram of another embodiment of the invention.

Referring now to the drawings, wherein like reference characters designate like or corresponding parts throughout the several figures, there is shown in Fig. 1 (which illustrates a conventional box car detector) a terminal 11 upon which angle tracking information pulses, automatic gain control information pulses, or others are placed. It is assumed that the desired information pulses are negative. The pulses on terminal 11 are fed through coupling capacitor 12 across resistor 13 to the cathode of diode 14. If these input pulses are of a positive character they raise the cathode of diode 14 to a higher voltage than the plate, and thus diode 14 does not conduct and thereby blocks the further passage of these positive pulses. Negative input information pulses lower the cathode voltage of diode 14 thereby causing this diode to conduct to charge trapping capacitor 16. The D. C. voltage on capacitor 16 resulting from the trapped charge is placed upon the grid of cathode follower triode 17 which provides a low impedance output thereof across resistor 18 on output terminal 19. Capacitor 16 must be discharged during each cycle or otherwise the charge on this capacitor increases until the resulting D. C. voltage blocks the conduction of diode 14 and of course then the D. C. output voltage on terminal 19 would have no significance relative to the magnitude of the input pulses applied at terminal 11. Diode 20 is shunted across capacitor 16 and is so polarized that the trapped charge on capacitor 16 holds diode 20 in a non-conducting condition. When it is desired to discharge capacitor 16, a discharge pulse is applied at terminal 21 and fed through coupling capacitor 22 through a grid-biasing arrangement comprising series resistors 23 and 24 to the grid of triode 26, thereby causing triode 26 to conduct. The conduction of triode 26 raises the voltage on the cathode of this tube which discharges capacitor 16 and also raises the plate of diode 20 above its cathode voltage thereby causing this diode to conduct and to prevent the voltage on the grid of tube 17 from going more positive, as a result of the discharge operation, than the bias voltage on terminal 28. This D. C. bias voltage establishes the voltage level at which the output on terminal 18 swings from in a negative direction.

The graph shown in Fig. 2 is a representation of the operation of the box car detector of Fig. 1 as well as the improved box car detector of Fig. 3, but will be explained only in relation to the operation of the conventional box car detector of Fig. 1. The ordinate values of this graph represent the voltage that is applied to the grid of cathode follower tube 17, and the abscissa values represent time. It is assumed that a discharge pulse has been applied at terminal 21 at the beginning of the time observation, that is at $t_0$ which is at the origin of this graph. At $t_0$ the discharge pulse causes diode 20 to conduct thereby establishing a very low resistance path for the voltage at terminal 28 to the grid of cathode follower tube 17. Neglecting the slight voltage drop across diode 20, the voltage on the grid of tube 17 is then the bias voltage $V_1$ applied at terminal 28. At time $t_1$, negative information pulses are received at terminal 11 and fed through capacitor 12 and diode 14 and the resulting charge is trapped on capacitor 16, which lowers the voltage applied to the grid of triode 17 to voltage $V_2$. The voltage at the grid of tube 17 is maintained at the $V_2$ level until time $t_2$ when a discharge pulse is applied at terminal 21 to render tube 26 conducting which discharges capacitor 16 and fires diode 20 to clamp the grid of tube 17 to the D. C. bias voltage $V_1$ applied at terminal 27. The grid of tube 17 remains at the $V_1$ level as previously explained until time $t_3$ when another group of information pulses are applied at terminal 11, and then the process is repeated. The voltage difference between level $V_2$ and $V_1$ is a function of the magnitude of the information pulses applied at terminal 11.

In Fig. 3, there is shown a preferred embodiment of the present invention polarized to be responsive to negative information pulses applied at input terminal 11. From a comparison of the circuits of Figs. 1 and 3, it can be noted that in Fig. 3 there is no multi-element tube, such as triode 26 of Fig. 1, for firing clamping diode 20. Instead, clamping diode 20 is fired by a shunt circuit comprising a series combination of secondary 32 of transformer 33, the parallel combination 35 of capacitor 34 and resistor 36, and diode 37. Diode 37 is connected to be polarized such that the negative charge trapped on capacitor 16 tends to render diode 37 in a conducting condition; however, the charge on capacitor 34 in self-biasing arrangement 35 overcomes the effects of this charge and tube 37 is non-conducting in the absence of a pulse on secondary 32. The discussion of the Fig. 3 embodiment will be limited to the operation of the clamping and discharge circuits since the operation of trapping the charge on capacitor 16 of Fig. 3 is the same as that previously explained in the discussion of the circuit of Fig. 1. The discharge pulse is supplied on terminal 21 to the primary 31 of transformer 33, which is preferably a step-up transformer. The windings of secondary 32 are wound such that the pulse appearing across this secondary in response to the discharge pulse applied to primary 31 places a positive voltage on the plate of diode 37 with respect to the cathode. The resulting conduction of diode 37 establishes a discharge path for the charge on capacitor 16 and also a path for the discharge pulse to be applied to clamping diode 20. The resulting conduction of diode 20 provides a negative clamping section; i. e. prevents the voltage on the grid of tube 17 from going positive with respect to the voltage applied at terminal 28 as a result of the positive discharge pulse, and also places this grid at a voltage which, neglecting the drop across diode 20, is the same as that applied to D. C. bias terminal 28. The discharge of capacitor 16 through self-biasing arrangement 35 maintains the bias voltage on capacitor 34. The time constant of resistor 36 and capacitor 34 is very long, approximately 100 times the period of the input information pulses, and thus self-biasing arrangement 35 provides a bias for diode 37 during the whole period in which capacitor 16 is charged; i. e., between time $t_2$ and time $t_1$ shown in the graph of Fig. 2.

The embodiment of Fig. 4 is similar to that shown in Fig. 3 except that the polarities of diodes 14, 20 and 37, and that of secondary 32 have been reversed to render this circuit responsive to positive information pulses applied at terminal 11 rather than negative pulses. The positive information pulses applied at terminal 11 are applied through capacitor 12 across resistor 13 causing diode 14 to conduct and place a positive charge on capacitor 16. Diode 20 is poled so that the positive charge on capacitor 16 maintains this diode in a non-conducting condition. The positive charge on capacitor 16 would cause conduction of diode 37 were it not for the bias on self-biasing circuit 35 which maintains diode 37 in a non-conducting condition in the absence of a pulse on secondary 32. When a discharge pulse is applied at terminal 21 to primary 31, the resulting pulse on secondary 32 overcomes the bias on self-biasing circuit 35, thereby rendering diode 37 conducting, and thus providing a discharge path for capacitor 16 and a firing path for the pulse on secondary 32 to be applied to diode 19 causing that diode to conduct and to restore the voltage on the grid of tube 17 to the voltage level of the voltage applied at terminal 28. The operation of cathode follower tube 17 is essentially the same as that explained in the discussion of Fig. 1. It is to be noted that only minor changes in the circuit of Fig. 3 are required to obtain the circuit of Fig. 4.

The improved box car detectors of Figs. 3 and 4 have many advantages over the conventional box car detector shown in Fig. 1. In Fig. 1, the negative voltage produced by the trapped charge on capacitor 16 tends to render triode 26 in a conducting condition, and to overcome this tendency a rather high negative charge is required to be supplied by the voltage dividing arrangement of series resistors 23 and 24 to the grid of triode 26. There is no need of such a negative voltage source in the circuits of Figs. 3 and 4. Also, the step-up transformer 33 in the improved box car detectors permits the utilization of a lower magnitude discharge pulse than is required in the conventional box car detector. An additional advantage in the circuits of Figs. 3 and 4 is that the peak inverse voltage of diode 37 is the limiting workable amplitude on the information pulses applied at input terminal 11 rather than the substantially lower maximum plate voltage applied to the discharge triode 26 of the circuit of Fig. 1. Another advantage of the improved box car detectors is that either positive or negative information pulses can be utilized without additional components or drastic changes in circuitry as would be required by the circuit of Fig. 1.

Although diodes are utilized in Figs. 3 and 4 to obtain rectifying and clamping functions, it is to be realized that other types of rectifiers could be employed, as for example copper-oxide rectifiers. If a low impedance output is not needed the cathode follower circuit could be replaced by a circuit that would provide amplification such as a D. C. amplifier. Of course, secondary 32, self-biasing circuit 35, and diode 37 can be rearranged without changing the operation of the shunt discharge circuit.

Obviously many modifications and variations of the present invention are possible in the light of the above teachings. It is therefore to be understood that within the scope of the appended claims the invention may be practiced otherwise than as specifically described.

What is claimed is:

1. A circuit for converting narrow input pulses into a continuous voltage the magnitude of which is a function of the number and amplitude of said narrow pulses, said circuit comprising: an input terminal at which said input pulses are applied, a first diode, a coupling capacitor for coupling said input terminal to the cathode of said first diode, a direct current bias terminal, a resistor connected between the cathode of said first diode and said direct current bias terminal, a charging capacitor having a first plate and a second plate, leads for connecting said first plate to the plate of said first diode and for connecting said second plate to said direct current bias terminal, a second diode having a plate connected to said first plate of said charging capacitor and having a cathode connected to the second plate of said charging capacitor, a cathode follower circuit having its input connected to the first plate of said charging capacitor, and a firing circuit for said second diode connected in parallel with said second diode and comprising: a step-up transformer having a primary with a terminal at which discharge pulses are applied and a secondary, a self-biasing circuit comprising a capacitor connected in parallel with a resistor and having a time constant which is much longer than the period of the input pulses applied at said input terminal, a third diode, and means for connecting said secondary, said self-biasing circuit, and the third diode in series such that the charge on said charging capacitor tends to render said third diode in a conducting condition and the pulse appearing on the secondary in response to a discharge pulse applied on said primary is of a polarity to render said third diode conducting.

2. A circuit for converting narrow input pulses into a continuous voltage the magnitude of which is a function of the number and amplitude of said narrow input pulses, said circuit comprising: an input terminal at which said input pulses are applied, a first diode, a coupling capacitor for coupling said input terminal to the plate of said first diode, a direct current bias terminal, a resistor connected between the plate of said first diode and said direct current bias terminal, a charging capacitor having a first plate and a second plate, leads for connecting said first plate to the cathode of said first diode and for connecting said second plate to said direct current bias terminal, a second diode having a cathode connected to said first plate of said charging capacitor and having a plate connected to the second plate of said charging capacitor, a cathode follower circuit having its input connected to the first plate of said charging capacitor, and a firing circuit for said second diode connected in parallel with said second diode and comprising: a step-up transformer having a primary with a terminal at which discharge pulses are applied and a secondary, a self-biasing circuit comprising a capacitor connected in parallel with a resistor and having a time constant which is much longer than the period of the input pulses applied at said input terminal, a third diode, and means for connecting said secondary, said self-biasing circuit, and the third diode in series such that the charge on said charging capacitor tends to render said third diode in a conducting condition and the pulse appearing on the secondary in response to a discharge pulse applied on said primary is of a polarity to render said third diode conducting.

3. A circuit for converting narrow input pulses to a continuous voltage, the magnitude of which is a function of the number and magnitude of said input pulses, said circuit comprising: an input terminal at which said input pulses are applied, a first rectifier, coupling means for coupling the pulses on said input terminal to an element of said rectifier such that said first rectifier is poled to pass said input pulses, a charging capacitor connected to be charged by the input pulses passed by said first rectifier, a second rectifier connected in parallel with said charging capacitor and poled such that the charge on said charging capacitor tends to maintain said second rectifier in a non-conducting condition, a cathode follower circuit having an input connected to be energized by the voltage on said charging capacitor, a direct current bias terminal connected to the element of said second rectifier that is not connected to the input of said cathode follower, and a discharge pulsing circuit upon the occurrence of an input discharge pulse for applying a pulse to said second rectifier to cause conduction thereof and the resulting clamping of the input voltage to said cathode follower at the voltage level applied at said direct current bias terminal, said discharge circuit comprising: a step-up transformer having a primary upon which said discharge pulses are applied and a secondary, a self-biasing circuit having a resistor and a capacitor connected in parallel and the magnitude of said capacitor said resistor being such that the time constant of said self-biasing circuit is much longer than the period of input pulses applied to said input terminal, a third rectifier, and means for connecting said secondary, said self-biasing circuit and said third rectifier in series with each other and in parallel with said second rectifier such that the charge on said charging capacitor tends to render said third rectifier in a conducting condition and the pulse generated in said secondary in response to a discharge pulse on said primary is of a polarity to render said third rectifier conducting.

4. A box car detector for converting narrow input pulses into a continuous voltage, said box car detector comprising: an input terminal at which said input pulses are applied, a charging capacitor having a first plate and a second plate, a direct current bias terminal connected to said second plate of said charging capacitor for maintaining said second plate at a voltage which is applied at said direct current bias terminal, rectifier means for conducting the input pulses on said first input terminal to said first plate of said charging capacitor to place a charge on said charging capacitor, a rectifier connected in parallel with said charging capacitor and poled such that the voltage resulting from a charge on said charging capacitor due to said input pulses tends to maintain said first rectifier in a non-conducting condition, an output terminal, means for connecting the voltage on the first plate of said charging capacitor to said output terminal without appreciably changing the charge on said charging capacitor, and a discharge pulsing circuit for placing said first rectifier in conducting condition upon the application of a discharge input pulse said discharge pulsing circuit comprising: a step-up transformer having a primary upon which said discharge pulse is applied and a secondary, self-biasing circuit having a time constant much longer than the period of the input pulses applied to said input terminal, and a second rectifier, and leads for connecting said secondary, said self-biasing circuit, and said second rectifier in series combination and the combination in parallel with said first rectifier such that the voltage resulting from the charge on said charging capacitor tends to cause said second rectifier to conduct but the voltage on said self-biasing circuit prevents the conduction of said second rectifier in the absence of a discharge pulse and the pulse on said secondary circuit resulting from said discharge pulse applied to said primary causes conduction of said second rectifier.

5. A box car detector for converting groups of narrow input pulses into a continuous voltage which is a function of the characteristics of each group of input pulses, said box car detector comprising: a first input terminal at which said groups of input pulses are applied, a charging capacitor, rectifier means for conducting said input pulses applied to said input terminal to charge said charging capacitor, output terminal means connected to produce an output voltage that is a function of the voltage on said charging capacitor, a direct current bias terminal upon which a direct current bias voltage is applied, clamping means connected to clamp the voltage of said charging capacitor at the direct current bias voltage at said direct current bias terminal when energized but which is normally maintained in a non-energized state by the charge on said charging capacitor, and a pulsing circuit comprising a series combination of a rectifier poled such that the voltage from the charge on said charging capacitor tends to fire said rectifier, a self-biasing circuit for biasing said rectifier so that the voltage from the charge on said discharging capacitor does not fire said rectifier and a transformer means for producing a pulse to fire said rectifier upon being pulsed by a discharge pulse.

References Cited in the file of this patent

UNITED STATES PATENTS

| | | |
|---|---|---|
| 2,411,573 | Holst et al. | Nov. 26, 1946 |
| 2,705,282 | Parode et al. | Mar. 29, 1955 |